US009107219B2

(12) United States Patent
Iyer et al.

(10) Patent No.: US 9,107,219 B2
(45) Date of Patent: Aug. 11, 2015

(54) METHOD AND SYSTEM TO CONFIGURE NETWORK ACCESS POINTS

(75) Inventors: Pradeep Iyer, Cupertino, CA (US); Subburajan Ponnuswamy, Cupertino, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 293 days.

(21) Appl. No.: 13/538,411

(22) Filed: Jun. 29, 2012

(65) Prior Publication Data

US 2014/0003355 A1    Jan. 2, 2014

(51) Int. Cl.
*H04W 4/00*    (2009.01)
*H04W 74/08*    (2009.01)
*H04W 28/02*    (2009.01)
*H04L 12/28*    (2006.01)

(52) U.S. Cl.
CPC .......... *H04W 74/08* (2013.01); *H04W 28/0268* (2013.01)

(58) Field of Classification Search
None
See application file for complete search history.

(56) References Cited

U.S. PATENT DOCUMENTS

2012/0257603 A1* 10/2012 Mercier ................ 370/338
2012/0263137 A1* 10/2012 Walton et al. .......... 370/329

* cited by examiner

*Primary Examiner* — Ayaz Sheikh
*Assistant Examiner* — Sori Aga (57) ABSTRACT

A method includes detecting a first value for a first parameter associated with a first access point of a plurality of access points and based at least on the first value for the first parameter associated with the first access point, configuring a second value for a second parameter associated with a second access point of the plurality of access points.

23 Claims, 4 Drawing Sheets

METHOD AND SYSTEM TO CONFIGURE NETWORK ACCESS POINTS

TECHNICAL FIELD

The present disclosure relates to configuring access points. In particular, the present disclosure relates to selecting values for parameters used by access points for data transmissions.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a wireless access point (WAP) that communicates wirelessly with devices using Wi-Fi, Bluetooth or related standards and that communicates with a wired network.

Access points configure various parameters for communicating with other devices and for supporting real time services while meeting Quality of Service (QoS) requirements. The specific values configured for various parameters determine the performance of an access point such as speed and reliability.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

General Overview

In one or more embodiments, parameter values for a particular access point are determined based on parameter values for one or more other access points. In an example, a set of two or more access points share a radio frequency channel. A first access point in the set of access points is aggressively configured with parameter values that result in the first access point using the radio frequency channel more frequently than at least a second access point which is not as aggressively configured as the first access point. Parameter values for the second access point are then reconfigured to match the parameter values of the first access point. Reconfiguration of the parameter values for the second access point results in fair access to the radio frequency channel by the first access point and the second access point. In another example, parameter values for a particular access point may be configured to exceed parameter values of one or more other access points. In another example, parameters values of one or more other access points are used as input to an algorithm to determine the parameter values of a particular access point (which may be lower, the same, or higher than parameter values of one or more other access points).

In one or more embodiments, parameter values associated with a first access category for a particular access point are determined based on parameter values associated with a second access category for one or more other access points, where the first access category and the second access category are different. In an example, a set of frames transmitted by a first access point includes video data. This set of frames is incorrectly classified under a voice category instead of a video category resulting in the video data being handled with priority designated for voice data. A first set of parameter values, associated with the voice category, for the first access point is determined. A second set of parameter values, associated with the video category, for the second access point is configured to match the first set of parameter values, associated with the voice category, for the first access point. As a result, the frames, classified under the video category, transmitted from the second access point receive the same priority as the frames, classified under the voice category, transmitted from the first access point.

Architectural Overview

Figure 1:
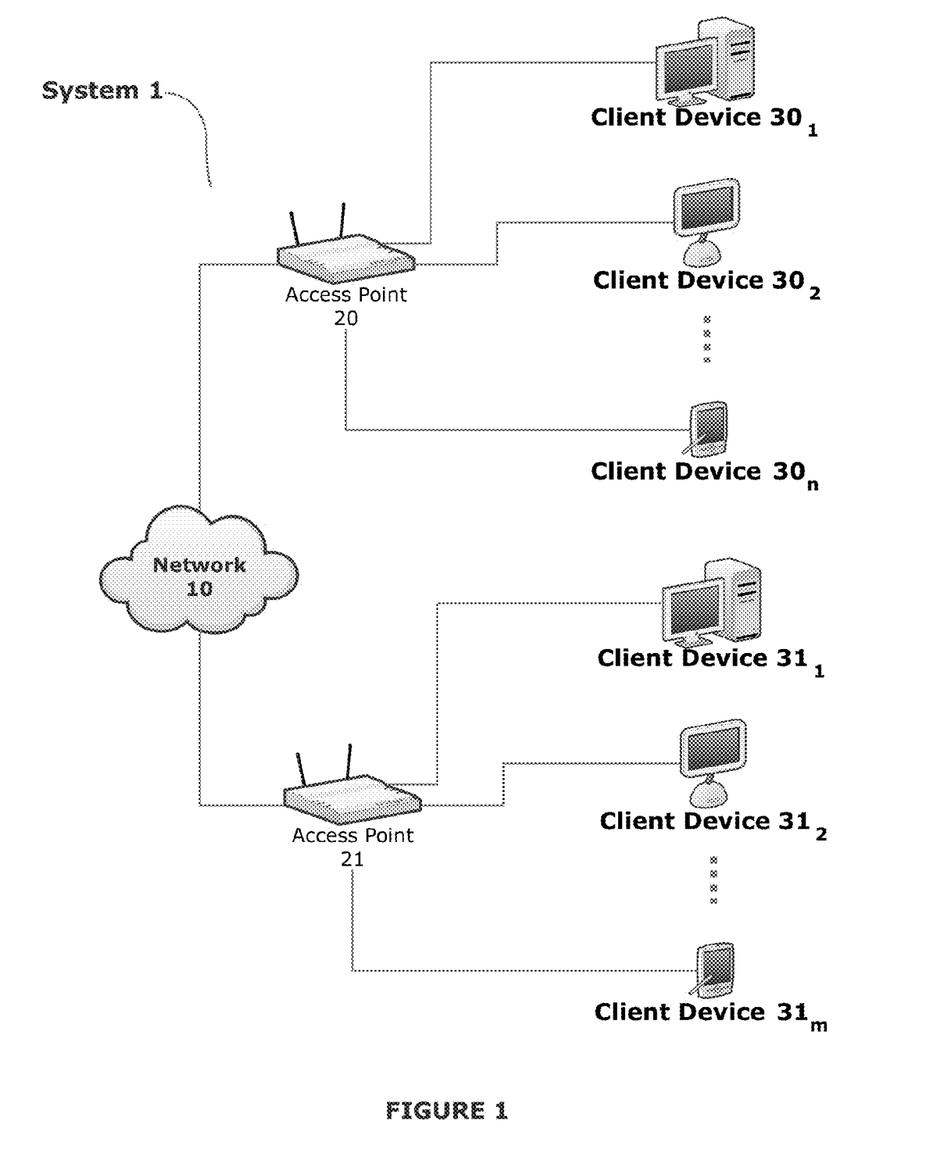
FIG. 1 shows a block diagram example of a system in accordance with one or more embodiments.

FIG. 1 shows a block diagram example of a system in accordance with one or more embodiments. System 1, as illustrated in FIG. 1, is a digital system that includes a network 10 (for example, a Local Area Network, a Wide Area Network, the Internet, Intranet, etc.), an access point 20, a set of client devices $30_1$-$30_n$ (n>1), an access point 21, and a set of client devices $30_1$-$30_m$ (m>1). The client devices may include any set of devices that communicate wirelessly with at least one of the access points within System 1. In one or more embodiments, System 1 may include more or less devices, than the devices illustrated in FIG. 1, that may be connected to other devices within System 1 via wired and/or wireless segments. In an example, System 1 may include a controller which is configured to communicate with one or more access points (for example, access point 20 and access point 21) within System 1. The controller may link access point 20 and access point 21 to network 10.

The access point 20 and the access point 21 are communicatively coupled to the network 10 via a transmission medium to send and receive data. The data may include, for example, video data. The transmission medium may be a wired or a wireless connection. The access point 20 and the access point 21 each correspond to a network device such as a wired access port, a wireless access port, a switch, a router, or any combination thereof. Access point 20 and access point 21 may be on a same network or different networks. The access point 20 communicatively couples client devices $30_1$-$30_n$ to the network 10 or other client devices by forwarding data to or from the client devices $30_1$-$30_n$.

In an embodiment, access point 20 and access point 21 use at least partially overlapping radio frequency channels for communicating with client devices $30_1$-$30_n$ and client devices $30_1$-$30_m$. In an example, Access point 20 uses a particular radio frequency channel for a portion of the time whereas access point 21 uses the same radio frequency channel for another portion of the time. Additional access points may share the same radio frequency channel (or partially overlapping radio frequency channels) with access point 20 and access point 21 in accordance with one or more embodiments. However, some examples refer to two access points sharing a same radio frequency channel for purposes of clarity. The amount of time that each access point uses the radio frequency channel is determined based at least in part on the values of parameters for each access point as described in detail below.

In an embodiment, the client devices $30_1$-$30_n$ are digital devices that include a processor, memory hierarchy, and input/output (I/O) interfaces including a wireless interface such as an IEEE 802.11 wireless interface. The wireless interface may be used to communicate with the access point 20. The client devices $30_1$-$30_n$ may be wireless electronic devices, capable of receiving the video data streams, such as personal computers, laptop computers, netbook computers, wireless music players, portable telephone communications devices, smart phones, tablets, and digital televisions.

Figure 2:
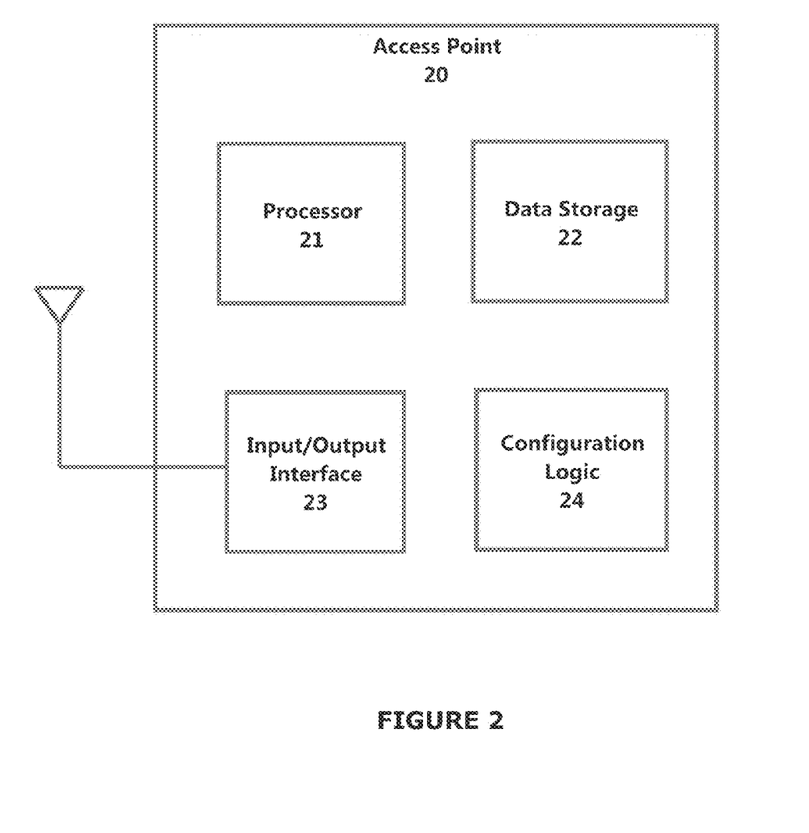
FIG. 2 shows a block diagram example of an access point 20 in accordance with one or more embodiments.

FIG. 2 shows a block diagram example of access point 20 in accordance with one or more embodiments. The access point 20 is a network device that comprises one or more of: a processor 21, data storage 22, an I/O interface 23, and a device configuration logic 24. Other access points within System 1 may be configured similarly or differently than access point 20.

The data storage 22 of the access point 20 may include a fast read-write memory for storing programs and data during the access point 20's operations and a hierarchy of persistent memory such as ROM, EPROM, and Flash memory for storing instructions and data needed for the startup and/or operations of access point 20. The data storage 22 stores data that is to be transmitted from the access point 20 or data that is received by access point 20. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 WiFi™ interface.

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, the device configuration logic 24 includes one or more functional units implemented using firmware, hardware, software, or a combination thereof for configuring parameters associated with the access point 20. Although, the device configuration logic 24 is shown as implemented on access point 20, one or more physical or functional components of the device configuration logic 24 may be implemented on a separate device. The individual functional components of the device configuration logic 24 are described below with Reference to FIG. 3.

Parameters Associated with Access Points

Wireless communication using access points involves configuration of one or more parameters which determine the Quality of Service (QoS) for communication by or with the access points. Parameter values determine how frequently access points request access to a radio frequency channel and/or use a radio frequency channel. Parameter values for a particular access point, that result in a radio frequency channel (or an overlapping portion of two radio frequency channels) being accessed more often by that particular access point relative to other access points, may be referred to herein as aggressive parameter values. In addition parameter values that are more aggressive relative to default or industry-standard parameter values for obtaining channel access may be referred to herein as aggressive parameter values. Examples of parameters are Enhanced Distributed Channel Access (EDCA) parameters and Hybrid Coordination Function Controlled Channel Access (HCCA) parameters.

HCAA parameters may include, but are not limited to data rate and jitter. EDCA parameters may include, but are not limited to:

a. Queue—A Queue parameter refers to one of a voice queue, a video queue, a best effort queue, and a background queue. Each queue may be associated with a different priority level.

b. Arbitration Inter-Frame Spacing (AIFS)—A time interval between frames being transmitted under the IEEE 802.11 standard.

c. Minimum Contention Window (CWmin)—Input to an algorithm that determines the initial random backoff wait time for retry of a transmission in response to failed attempt (for example, due to unavailability of a radio frequency channel). The random backoff wait time may be increased when a frame transmission is unsuccessful due to the channel being unavailable for the transmission.

d. Maximum Contention Window (CWmax)—The maximum random backoff wait time.

e. Maximum Burst—The maximum burst length allowed for packet bursts (collection of multiple frames transmitted without header information) on the wireless network.

f. Transmission Opportunity (TXOP) Limit—An interval of time when a client device has the right to initiate transmissions toward an Access Point and send as many frames as possible.

g. Beacon Interval—An interval of time between beacon frame transmissions. A beacon frame is one of the management frames in IEEE 802.11 based WLANs and includes information about the network. A beacon frame broadcasted by an access point may include values for parameters associated with that access point.

h. Delivery Traffic Indication Message (DTIM) Period—A number that determines how often a beacon frame includes a DTIM. A value of the DTIM is included in each beacon frame. A DTIM is included in beacon frames to indicate to the client devices whether the access point has buffered broadcast and/or multicast data waiting for the client devices.

In an embodiment, access categories are defined for classifying network traffic. Each access category, configured for an access point, is associated with a corresponding set of parameter values. Transmission of frames, classified under a particular access category, are transmitted according to the set of parameter values corresponding to the particular access category. Table 1 shows an example of four access categories (background, best effort, video, and voice) and respective parameter values as configured for a first access point:

TABLE 1

| Access Category | CWmin | CWmax | AIFS | Maximum TXOP |
| --- | --- | --- | --- | --- |
| Background | 15 | 1023 | 7 | 0 |
| Best Effort | 15 | 1023 | 3 | 0 |
| Video | 7 | 15 | 2 | 3.008 ms |
| Voice | 3 | 7 | 2 | 1.5404 ms |

In the above example, frames classified under the video category are transmitted by the first Access Point using value 7 for CWmin, value 15 for CWmax, and value 2 for AIFS. A second access point may be configured differently than the first access point by using different parameter values.

Table 2 shows an example of four access categories and associated parameter values as configured for a second access point that is different than the first access point:

TABLE 2

| Access Category | CWmin | CWmax | AIFS | Maximum TXOP |
| --- | --- | --- | --- | --- |
| Background | 15 | 1023 | 7 | 0 |
| Best Effort | 15 | 1023 | 3 | 0 |
| Video | 5 | 10 | 1 | 3.008 ms |
| Voice | 3 | 7 | 2 | 1.5404 ms |

In the above example, frames classified under the video category are transmitted by the second access point using value 5 for CWmin, value 10 for CWmax, and value 1 for AIFS. The second access point is configured more aggressively than the first access point because the second access point has lower values for CWmin, CWmax, and AIFS resulting in more frequent attempts to obtain channel access and more frequent transmission of frames.

The first access point and the second access point compete for access to the shared radio frequency channel. In an example, the first access point attempts to transmit packets for a particular video stream at the same time the second access point is transmitting a first set of packets for another video stream. Since the radio frequency channel is unavailable to the first access point (the radio frequency channel is being used by the second access point to send the first set of packets), the first access point again attempts to transmit after a random period of time that is computed based at least on CWmin and CWmax. The random period of time may be referred to herein as a random backoff time. However, the second access point may be transmitting a second set of packets when the first access point attempts again because the lower values for CWmin and CWmax used by the second access point result in the second access point requesting channel access more frequently than the first access point. Furthermore, the second access point transmits more frames per time period than the first access point because the AIFS parameter value is lower for the second access point. The difference in parameter values results in the second access point using a channel, shared with the first access point, for a larger percentage of time than the first access point to transmit video data. The difference in parameter values is directly correlated to the disparity in channel access or correlated to a measure of unfair channel access. In an example, a large difference in parameter values results in a buffer overflow condition for the first access point if the rate of receiving data is greater than the rate of sending data (due to unavailability of the radio frequency channel). In contrast, similar parameter values for different access points results in approximately equal channel access time which is referred to herein as fair channel access. A shared radio frequency channel is referred to in one or more examples for purposes of clarity. Embodiments are applicable to the use of two different radio frequency channels with at least a portion of overlapping frequencies such that one of the two different radio frequency channels is used at a given time to avoid interference.

Device Configuration Logic

Figure 3:
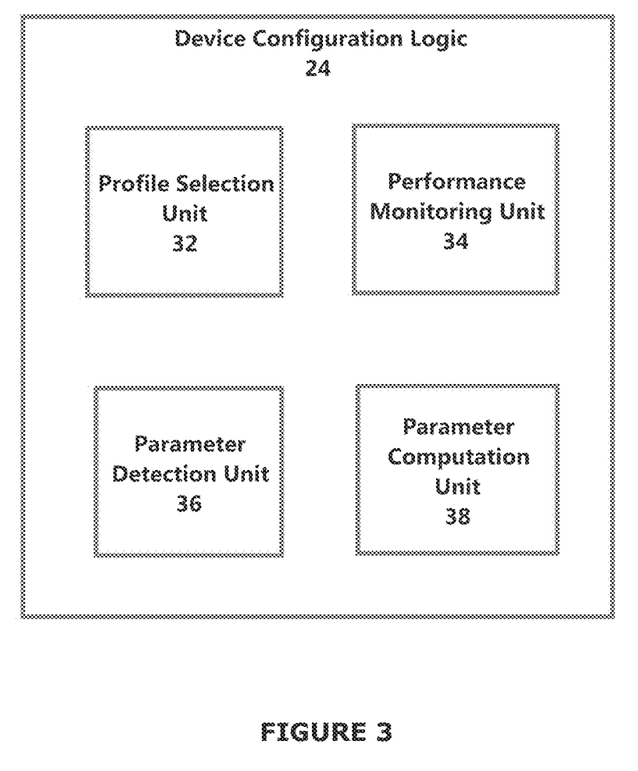
FIG. 3 illustrates an example of device configuration logic 24 in accordance with one or more embodiments.

FIG. 3 illustrates an example of device configuration logic 24 in accordance with one or more embodiments. The device configuration logic 24 includes functional units implemented using firmware, hardware, software, or a combination thereof. In one or more embodiments, the device configuration logic 24 is implemented with functional units including a profile selection unit 32, a performance monitoring unit 34, a parameter detection unit 36, and a parameter computation unit 38. Components and functionalities described with reference to a particular functional unit may instead be implemented within another functional unit. Furthermore, two or more functional units may be combined into a single program or single device. A single functional unit may be implemented as multiple devices or multiple applications that each performs a portion of the functions described herein.

In an embodiment, the profile selection unit 32 includes functionality to select a device profile for configuration of the parameters. Examples of device profile types include a static profile and a dynamic profile. A static profile uses static values for one or more parameters associated with an access point. A dynamic profile uses dynamic values for one or more parameters associated with an access point. A dynamic profile may be associated with an initial set of values for one or more parameters that are updated in response to environmental conditions. The initial set of values for a static profile or a dynamic profile may be obtained by the profile selection unit 32 from an administrator, computed based on environmental conditions (for example, buffer capacity or use), determined based on parameter values of another access point(s), or determined using another suitable method.

In an embodiment, the performance monitoring unit 34 includes functionality to monitor the performance of access point 20. For example, the performance monitoring unit 34 determines whether a rate of successful outbound packet transmissions from access point 20 meet a minimum threshold. In another example, the performance monitoring unit 34 determines whether the packet drop rate for transmission by access point 20 is higher than a maximum threshold. In an example, the performance monitoring unit 34 monitors the use, throughput, capacity, availability or buffer characteristics for an access point. In an embodiment, the performance monitoring unit 34 evaluates the access point based on one or more performance metrics and submits the evaluation to the parameter computation unit 38.

In an embodiment, the performance monitoring unit 34 includes functionality to monitor the performance of client devices associated with an access point. In an example, the performance monitoring unit 34 monitors the performance of client device $30_1$. The performance of client device $30_1$ may include a rate at which a video stream is received from access point 20. The performance monitoring unit 34 may deduce a performance measurement for an access point based on the performance of client devices mapped to that access point for communication with a network.

In an embodiment, the parameter detection unit 36 on access point 20 includes functionality to detect the configured values of one or more parameters associated with one or more other access points (for example, access point 21). In an example, parameter detection unit 36 on access point 20 receives beacons broadcasted by access point 21 and analyzes the beacons to determine the values of the parameters for access point 21. In an embodiment, the parameter values of access point 21 are estimated by the parameter detection unit 36 based on packet transmissions broadcasted by access point 21. For example, a value for the Arbitration Inter-Frame Spacing (AIFS) parameter is estimated by monitoring frames transmitted by access point 21 for a period of time and detecting a minimum time between transmission of any set of two frames by access point 21. In an embodiment, the parameter detection unit 36 submits the parameters of one or more access points (for example, access point 21) to the parameter computation unit 38. In an embodiment, the parameter detection unit 36 is implemented on a device (not shown) other than access point 20 and transmits detected parameter values for access point 21 to access point 20.

In an embodiment, the parameter computation unit 38 includes functionality to compute one or more values for parameters associated with access point 20 based on data received from the profile selection unit 32, the performance monitoring unit 34, and the parameter detection unit 36. The parameter computation unit 38 obtains a current device profile from the profile selection unit 32. The parameter computation unit 38 receives performance data from the performance monitoring unit 34. The parameter computation unit 38 receives values of parameters associated with other access points from the parameter detection unit 36.

The operations that may be performed by the parameter computation unit 38 (or by other functional units) for computing one or more values for parameters associated with access point 20 are described below with reference to FIG. 4.

Determining Parameter Values for Access Points

Figure 4:
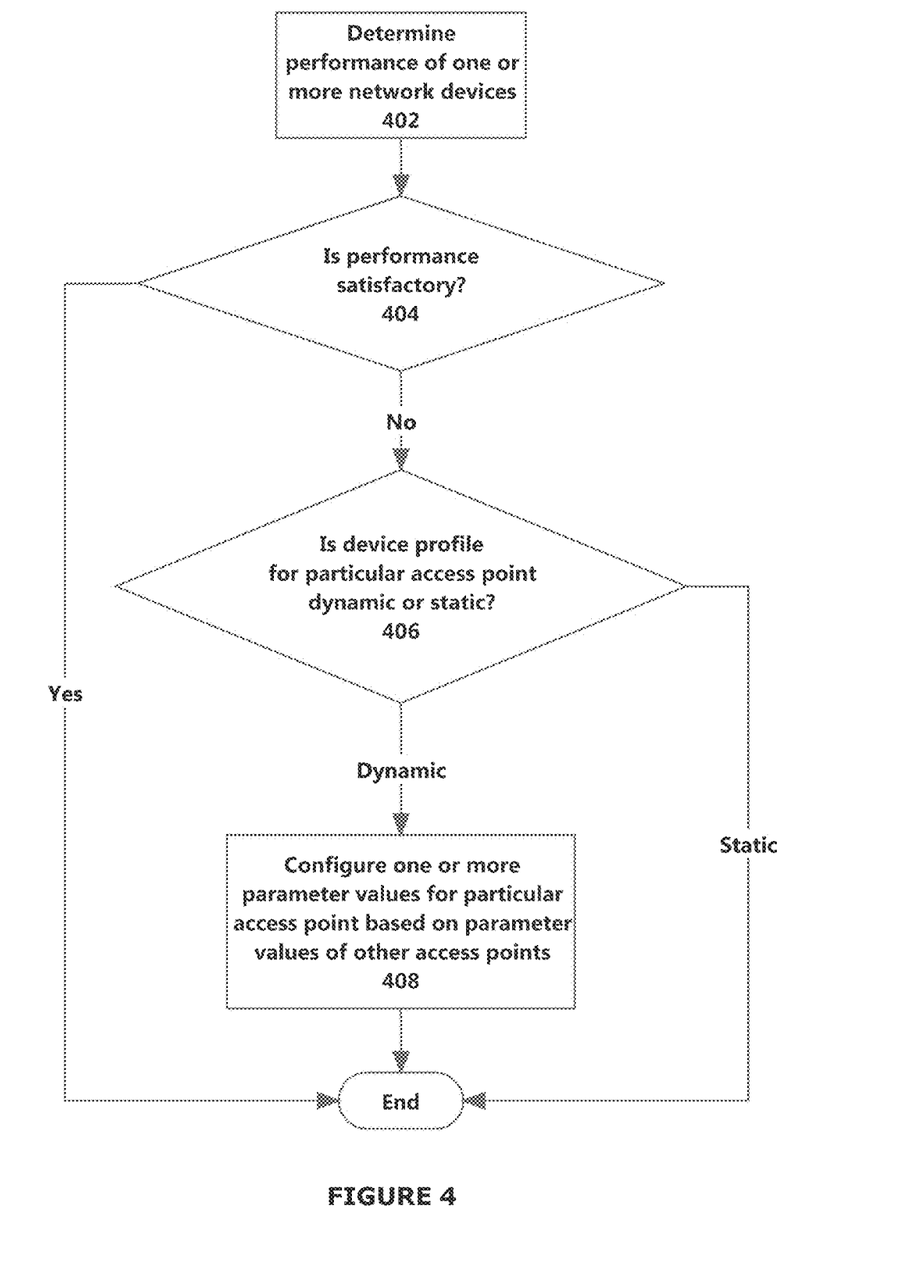
FIG. 4 illustrates an example method for determining parameter values for access points.

FIG. 4 illustrates an example method for determining parameter values for access points. One or more operations illustrated in FIG. 4 may be modified, rearranged, or omitted all together.

Initially, performance of one or more network devices (including access points and/or client devices) is determined (Block 402). In an embodiment, performance of a particular access point is determined by that particular access point or by another network device. Determining the performance of an access point may include determining a reliability and/or a speed of data transmitted by the access point or received by the access point. In an example, performance of a particular access point, while sharing a radio frequency channel with other access points, is compared to performance of the particular access point while having exclusive access on the radio frequency channel. In another example, performance of an access point is measured based on a quantity of successfully transferred data in a particular period of time. Performance of an access point may be computed based on a data packet buffer at an access point. For example, the usage and capacity of a data packet buffer, may indicate whether an access point is able to transmit data at a sufficient rate. A buffer overflow indicates that the access point is not performing at a sufficient level.

In an embodiment, performance of client devices in communication with a particular access point may be determined. The performance of the client devices may be used to deduce the performance of the access point. For example, interruptions in a video stream or voice stream being received at a client device may be used to deduce that the access point does not have sufficient channel access to transmit data to the client device at a satisfactory rate.

In an embodiment, determining performance of network devices includes determining a percentage of time that each network device has access to a radio frequency channel. In an example, channel access by each access point is measured and compared to channel access by other access points to determine if the channel is fairly shared among different access points. Fair channel access between different access points is rated well whereas unfair or unequal channel access between different access points is rated poorly.

The performance determined for one or more networks devices (or radio frequency channel) is compared to one or more thresholds to determine if the performance of the one or more network devices is satisfactory (Block 404). In an example, the performance of a particular access point sharing a radio frequency channel is compared to a performance of the same access point in an exclusive channel access mode. If the amount of data successfully transmitted by the particular access point while sharing a radio frequency channel is at least x percentage of the amount of data successfully transmitted by the particular access point while in the exclusive channel access mode, then the performance of the particular access point in the shared mode is determined to be satisfactory.

In another example, if an access point buffer overflows or reaches x percentage capacity, then the performance of the access point is deemed to be unsatisfactory. In another example, the packet loss for video streams received at a client device is measured. If the number or percentage of packets lost reaches a particular threshold, then the performance of the access point transmitting the video stream to the client device is deemed unsatisfactory.

In an example, if the difference between channel access time for a first access point and a second access point exceeds a particular threshold, performance of an access point or performance of a set of network devices is deemed unsatisfactory.

In an embodiment, a determination is made whether the device profile for a particular access point is set to a dynamic profile or a static profile (Block 406). In an example, the profile selection unit 32 sets a flag which indicates whether the current device profile is static or dynamic. If the current device profile is set to static, then the parameter values cannot automatically be reconfigured. If the current device profile is set to dynamic, then the parameter values can be automatically reconfigured as described below. In another example, a device profile may indicate that a subset of parameters are dynamically configurable and another subset of parameters are static. Accordingly, some values for parameters may be modified automatically whereas other values for parameters may not be modified.

One or more parameter values that may be modified dynamically are configured in accordance with one or more embodiments (Block 408). The operations described below may also be used to determine the initial configuration of parameter values for a static parameter values.

In an example, the configuration of parameter values for an access point is performed immediately in response to determining that performance of the access point is not satisfactory (for example, performance below a performance threshold). In another example, the configuration of parameter values for an access point may be performed after determining that the performance of the access point has been unsatisfactory for x period of time. The configuration of parameter values may be performed periodically.

In an example, the configuration of parameter values is performed in response to user input. A user of a client device experiences poor performance and initiates a request for improved performance. In response to the user request, a client device submits a request for re-configuration of parameter values to an associated access point. The access point then reconfigures parameter values to improve the performance of that access point.

In an example, the configuration of parameter values is performed in response to system events. For example, each time a new access point is added to a local area network that shares channel access with other access points, each access point may reconfigure respective parameter values in accordance with one or more embodiments.

In an embodiment, the parameter values for a particular access point are configured to match the parameter values for one or more other access points. In an example, a particular access point defines four access categories where each access category is associated with a respective set of parameter values. During reconfiguration of the particular access point, the parameters values used by another access point are determined for each of the same access categories and copied.

Referring to Table 1 and Table 2, which recite the parameter values for a first access point and a second access point, respectively, the parameter values indicated in Table 1 for the first access point may be reconfigured to copy the parameter values indicated in Table 2 for the second access point. As a result of the reconfiguration, the first access point will request channel access approximately as frequently as the second access point for the same access category of data.

In another embodiment, the parameter values for a particular access point are configured based on an algorithm which uses the parameter values of one or more other access points as input. Referring again to the above example, the parameter values listed in Table 1 may be averaged with the parameter values listed in Table 2 to determine the new parameter values for Table 1. The algorithm, which uses the parameter values of one or more other access points as input, may determine parameter values for the particular access point that are identical to, lower than, or higher than the parameter values of the one or more other access points.

In an embodiment, parameter values for the first access point (listed in Table 1) are incrementally improved until the parameter values match the parameter values for the second access point (listed in Table 2). In an example, performance of the first access point is monitored. In response to determining that the performance of the first access point for sending video packets is unsatisfactory and determining that the parameter values for the second access point are more aggressively configured than the parameter values for the first access point: CWmin is changed from 7 to 6 and CWmax is changed from 15 to 14. Thereafter, performance of the first access point is monitored again to determine if the performance of the first access point is satisfactory. If the performance of the first access point is satisfactory, then no further changes to the parameter values are made. If the performance of the first access point is unsatisfactory, the parameter values are again updated. The process is repeated until the parameter values of the first access point match the parameter values of the second access point.

In an embodiment, the parameter values of a particular access category for a first access point are copied from the parameter values of a different access category for a second access point. In an example, a first access point, configured with parameter values listed in Table 1, determines that the second access point is transmitting video data packets using the voice access category. The determination that video data packets are being transmitted using the voice access category is made by analyzing frames that are sent using the voice access category to determine if they match typical voice data characteristics. If the intra-frame gap in the transmission of the frames and a size of the frames are typical for voice data, then the first access point determines that the frames transmitted by the second access point are properly classified under the voice access category. Alternatively if either the intra-frame gap in the transmission of the frames or the size of the frames do not match typical voice data characteristics, then a determination is made that the frames classified under the voice access category do not actually include voice data. A further determination may be made that the frames include video data based on frame characteristics or transmission characteristics that are typical for video data. Accordingly, the first access point determines that the second access point is transmitting video data improperly classified under a voice access category. Since voice access category parameters are generally more aggressive than video access category parameters, the second access point may obtain greater channel access to send video data than the first access point to send video data. To obtain fair channel access, the first access point reconfigures the parameters for the video access category to match the parameters of the voice access category for the second access point.

Configuration Limits

In an embodiment, upper or lower bound limits are used for configuration of parameter values. The parameter values for a particular access point are decreased to match the parameter values for another access point only until a lower bound limit is met. In an example, an initial CWmin value is 15 for a first access point, a lower bound limit is 12 for the CWmin value for the first access point, and an initial CWmin value is 10 for a second access point. In this example, the CWmin value is lowered but is not configured to match the CWmin value of the second access point. Specifically, the CWmin value is configured to 12 (the lower bound limit) which is higher than the CWmin value 10 of the second access point.

In an embodiment, upper or lower bound limits may be dynamically computed as a function of device performance. For example, a poorly performing device may have more lenient limits to allow for more aggressive configuration of parameter values and a well performing device may have stricter limits to allow for less aggressive configuration of parameter values.

Configuring Parameter Values for a Particular Access Point Based on Parameter Values of Two or More Other Access Points In an embodiment, parameter values for a particular access point are configured based on the parameter values for two or more other access points. In an example, a particular access point detects the most aggressive parameter values (i.e., parameter values that result in the greatest share of channel access) from a set of parameter values used by two or more other access points. Thereafter, the particular access point reconfigures itself such that parameter values for the particular access point are identical to the most aggressive parameter values that were detected.

In an embodiment, parameter values for a particular access point are configured based on an average of other parameter values within a virtual area network that share the same radio frequency channel as the particular access point.

In an embodiment, certain parameter values (for example, CWmin and CWmax) for a particular access point are configured based on parameter values of other access points. However, other parameter values (for example, AIFS) for the particular access point are not configured based on parameter values of other access points.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by a network device, including a hardware processor and a memory unit, comprising:
    detecting a first value for a first parameter associated with a first access point of a plurality of access points, wherein the first parameter is associated with a first access category of a plurality of access categories;
    determining that a set of frames, transmitted by the first access point, was classified under the first access category;
    determining that the set of frames was improperly classified under the first access category; and
    based at least on the detected first value for the first parameter associated with the first access point and responsive to determining that the set of frames, transmitted by the first access point, was improperly classified, configuring a second value for a second parameter associated with a second access point of the plurality of access points, wherein the second parameter is associated with a second access category of the plurality of access categories, and wherein the first access category is different from the second access category.

2. The method of claim 1, wherein the second value is identical to the first value.

3. The method of claim 1, wherein the second value is determined based at least on:
    the detected first value for the first parameter associated with the first access point; and
    a detected third value for a third parameter associated with a third access point of the plurality of access points, wherein the third parameter is associated with a third access category of the plurality of access categories.

4. The method of claim 3, further comprising:
    selecting one of the detected first value and the detected third value, as the second value for the second parameter associated with the second access point, that will result in the best performance of the second access point.

5. The method of claim 1, wherein detecting the first value comprises detecting a value for one or more parameters in a beacon transmitted by the first access point.

6. The method of claim 1, wherein the first parameter comprises an Enhanced Distributed Channel Access (EDCA) parameter.

7. The method of claim 1, wherein the first parameter comprises one of
    an EDCA minimum contention window;
    an EDCA maximum contention window;
    an EDCA arbitration inter-frame space; or
    an EDCA transmit opportunity period.

8. The method of claim 1, wherein the first access point and the second access point use at least partially overlapping radio frequency channels.

9. The method of claim 1, wherein determining that the set of frames is improperly classified under the first access category comprises determining:
    (a) an intra-frame gap between two frames of the set of frames does not match a characteristic intra-frame gap associated with frames classified under the first access category; or
    (b) a packet size of at least one frame of the set of frames does not match a characteristic packet size associated with frames classified under the first access category.

10. The method of claim 1, wherein determining that the set of frames is improperly classified under the first access category comprises: determining
    (a) an intra-frame gap between two frames of the set of frames matches a characteristic intra-frame gap associated with frames classified under the second access category; or
    (b) a packet size of at least one frame of the set of frames matches a characteristic packet size associated with frames classified under the second access category.

11. The method of claim 1, wherein the plurality of access categories comprises:
    a background category;
    a best effort category;
    a video category; and
    a voice category.

12. A non-transitory computer readable storage medium comprising instructions that, when executed by one or more processors in a network device, cause the network device to:
    detect a first value for a first parameter associated with a first access point of a plurality of access points, wherein the first parameter is associated with a first access category of a plurality of access categories;
    determine that a set of frames, transmitted by the first access point, was classified under the first access category;
    determine that the set of frames was improperly classified under the first access category; and
    based at least on the detected first value for the first parameter associated with the first access point and responsive to determining that the set of frames, transmitted by the first access point, was improperly classified, trigger a second access point of the plurality of access points to set a second parameter associated with the second access point to a second value, wherein the second parameter is associated with a second access category of the plurality of access categories, and wherein the first access category is different than the second access category.

13. The computer readable storage medium of claim 12, wherein the second value is identical to the detected first value.

14. The computer readable storage medium of claim 12, wherein the second value is determined based at least on:
    the detected first value for the first parameter associated with the first access point; and
    a detected third value for a third parameter associated with a third access point of the plurality of access points, wherein the third parameter is associated with a third access category of the plurality of access categories.

15. The computer readable storage medium of claim 14 that comprises further instructions that, when executed by the one or more processors in the network device, cause the network device to:
    select one of the detected first value and the detected third value, as the second value for the second parameter associated with the second access point, that will result in the best performance of the second access point.

16. The computer readable storage medium of claim 12, wherein detecting the first value comprises detecting one or more parameters in a beacon transmitted by the first access point.

17. The computer readable storage medium of claim 12, wherein the first parameter comprises an Enhanced Distributed Channel Access (EDCA) parameter.

18. The computer readable storage medium of claim 12, wherein the first parameter comprises one of:
- an EDCA minimum contention window;
- an EDCA maximum contention window;
- an EDCA arbitration inter-frame space; or
- an EDCA transmit opportunity period.

19. The computer readable storage medium of claim 12, wherein the first access point and the second access point use at least partially overlapping radio frequency channels.

20. The computer readable storage medium of claim 12, wherein determining that the set of frames is improperly classified under the first access category comprises determining:
- (a) an intra-frame gap between two frames of the set of frames does not match a characteristic intra-frame gap associated with frames classified under the first access category; or
- (b) a packet size of at least one frame of the set of frames does not match a characteristic packet size associated with frames classified under the first access category.

21. The computer readable storage medium of claim 12, wherein determining that the set of frames is improperly classified under the first access category comprises: determining
- (a) an intra-frame gap between two frames of the set of frames matches a characteristic intra-frame gap associated with frames classified under the second access category; or
- (b) a packet size of at least one frame of the set of frames matches a characteristic packet size associated with frames classified under the second access category.

22. The computer readable storage medium of claim 12, wherein the plurality of access categories comprises:
- a background category;
- a best effort category;
- a video category; and
- a voice category.

23. The method of claim 1, wherein the network device is the second access point.

* * * * *

UNITED STATES PATENT AND TRADEMARK OFFICE
CERTIFICATE OF CORRECTION

| | | |
|---|---|---|
| PATENT NO. | : 9,107,219 B2 | Page 1 of 1 |
| APPLICATION NO. | : 13/538411 | |
| DATED | : August 11, 2015 | |
| INVENTOR(S) | : Pradeep Iyer et al. | |

It is certified that error appears in the above-identified patent and that said Letters Patent is hereby corrected as shown below:

Claims

In column 11, line 53, in Claim 7, delete "of" and insert -- of: --, therefor.

Signed and Sealed this
Eighth Day of March, 2016

Michelle K. Lee
*Director of the United States Patent and Trademark Office*